United States Patent [19]

Sau

[11] Patent Number: 4,992,538
[45] Date of Patent: Feb. 12, 1991

[54] SILATED POLYSACCHARIDES

[75] Inventor: Arjun C. Sau, Newark, Del.

[73] Assignee: Aqualon Company, Wilmington, Del.

[21] Appl. No.: 361,854

[22] Filed: Jun. 5, 1989

[51] Int. Cl.$^5$ .................. C08B 11/02; C08B 11/16; C08B 11/193; C01B 33/04

[52] U.S. Cl. .................................. 536/84; 536/85; 536/88; 536/90; 536/91; 536/92; 536/93; 536/94; 536/95; 536/96; 536/97; 536/98; 536/99; 536/100; 536/101; 423/347

[58] Field of Search .............. 423/326, 331, 340, 341, 423/344, 347; 435/100, 101; 536/84, 85, 88, 90, 91, 92, 93, 94, 95, 96, 97, 98, 99, 100, 101

[56] References Cited

U.S. PATENT DOCUMENTS

| | | | |
|---|---|---|---|
| 3,729,438 | 4/1973 | Plesich et al. | 260/29.6 R |
| 4,106,948 | 8/1978 | Cooper et al. | 106/197 |
| 4,474,950 | 10/1984 | Felcht et al. | 536/85 |
| 4,480,072 | 10/1984 | Mallon | 525/61 |
| 4,489,117 | 12/1984 | Ono et al. | 428/147 |
| 4,604,443 | 8/1986 | Chang et al. | 528/28 |

FOREIGN PATENT DOCUMENTS 3232467  9/1982  Fed. Rep. of Germany ........ 536/95

*Primary Examiner*—Thurman K. Page
*Assistant Examiner*—C. Azpuru
*Attorney, Agent, or Firm*—James K. Luchs

[57] ABSTRACT

Silated polysaccharides having 0.0005 to 2.0 silyl molar substitution per anhydrosaccharide unit form water resistant films when cast from aqueous solution and dried in the presence of atmospheric carbon dioxide. These films are soluble in aqueous caustic. A preferred water soluble polymer is a cellulose ether with 0.005 to 1.0 silyl substitution.

8 Claims, No Drawings

SILATED POLYSACCHARIDES

FIELD OF INVENTION

The invention relates to chemically modified water soluble polymers. In particular the invention relates to a new class of silated polysaccharides with new and useful properties.

BACKGROUND OF THE INVENTION

Water soluble polysaccharides find wide industrial applications as rheology modifiers, film formers and binders. They are widely used as thickeners to control the rheology of various water-based formulations, such as latex paints, drilling muds, cosmetics and building materials. Chemically modified natural polysaccharides, such as cellulose, guar and starch are a large class of commercial water soluble polymers. Specific examples include sodium carboxymethylcellulose, hydroxyethylcellulose, hydroxypropylcellulose, and carboxymethyl guar. Water soluble polymers such as these are commercially available from Aqualon Company, Wilmington, Del.

Silane coupling agents are known as a useful means to form crosslinks between organic and inorganic materials. Additionally, references which disclose interactions between polymers and silane coupling agents include: U.S. Pat. No. 3,729,438 on latex polymers of vinyl acetate and a silane; U.S. Pat. Nos. 4,106,948, 4,474,950, 489,117 and 4,604,443 on polyvinyl alcohol and partially hydrolyzed silanes. U.S. Pat. No. 4,480,072 discloses silane coupling agents to crosslink hydroxylated polymers with alkyl silicates or their hydrolyzed condensates.

Silane coupling agents are commercially available for a variety of crosslinking applications from companies such as Dow and Union Carbide.

A drawback common to the aforementioned prior art is the necessity of using relatively high amounts of silane coupling agents to effect insoluble film formation when they are used in simple admixture with various polymers.

SUMMARY OF INVENTION

A new composition of matter comprises a water soluble silated polysaccharide useful in the form of a film or powder for industrial, pharmaceutical, medical and cosmetic applications.

The water soluble polymer comprises an organosilyl modified polysaccharide with a hydrolytically stable silyl group covalently bonded to the polysaccharide wherein the number of silyl group per anhydrosaccharide unit ranges from 0.005 to 2.0.

Particularly useful for film forming applications is an anionic polymer salt comprising a silated polysaccharide wherein an organosilanolated species is covalently bonded to a polysaccharide through an amine, carbamyl or ether linkage to a degree of substitution between 0.005 and 0.5. More specifically, an aqueous solution of an alkali metal or ammonium salt of the anionic polymer can self-crosslink in the presence of atmospheric carbon dioxide to form a water resistant film which is soluble in caustic.

A method for producing a silated water soluble polysaccharide polymer comprises the following steps:

(1) reacting a polysaccharide with an organosilicon reagent having an epoxy, halogen, isocyanate or vinyl group; and
(2) recovering a silated polysaccharide.

For example, a silated polysaccharide may comprise carboxymethylcellulose reacted with (3-glycidoxy)-propyltrimethoxysilane or vinyltrimethoxysilane.

DETAILED DESCRIPTION OF THE INVENTION

A new class of water soluble silated polysaccharides has been discovered to expand previously known modifications and substitutions. It was surprising to find that polysaccharides can be directly modified with low degrees of silyl substitution to give novel and useful compositions of matter.

Organosilanes useful for practicing the invention have the following general structure:

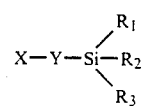

where,

X = a functional group capable of reacting with polysaccharide bound nucleophiles, such as hydroxyl, amine or thiol groups.

Y = a hydrocarbyl spacer group between X and the silicon atom.

$R_1$, $R_2$ and $R_3$ are groups attached to the silicon. At least one of these groups must be hydrolyzable, such as halogen, alkoxy, aryloxy, acyloxy, siloxy or amine. The remainder can constitute a combination of alkyl or arylalkyl groups.

The following X groups could be used to incorporate the silyl substituent into the polymer.

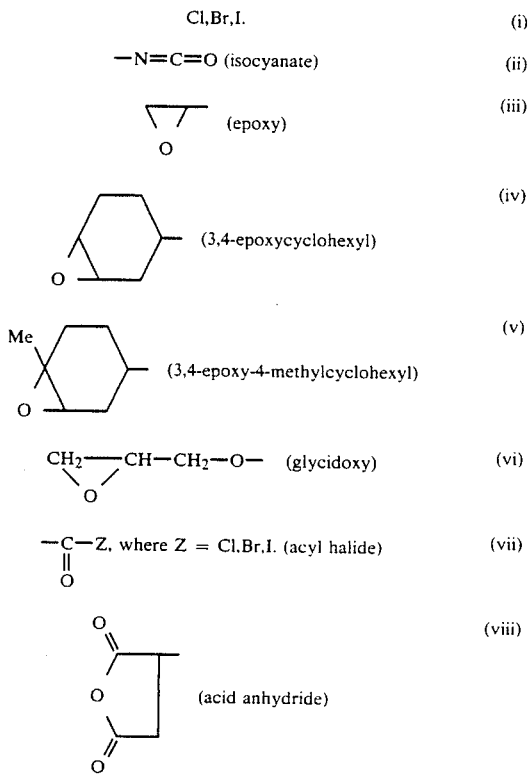

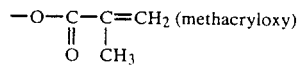 (ix)

In addition to these reagents, vinylalkoxysilanes of the general formula.

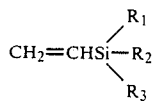

are also useful reagents for practicing this invention.

It has been found that hydroxyethylcellulose (HEC) reacts with (3-glycidoxypropyl)trimethoxysilane (GPTMS) in the presence of caustic to form the silated HEC (SIL-HEC) according to the following reaction scheme.

HEC—OH +

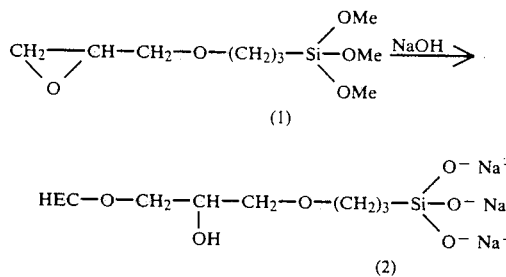

The formation of the anionically substituted HEC (2) from the reaction of HEC with the nonionic organosilane (1) is due to the hydrolysis of $\equiv$Si(OMe) groups of the latter under the alkaline conditions used to etherify the HEC. That is, (1) is converted to the sodium silanolate (3).

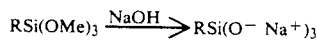

(1)           (3)

where

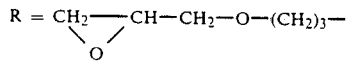

The sodium silanolate species (3), generated in situ, reacts with HEC to form the silated derivative (2).

A series of SIL-HEC's (silyl molar substitution ~0.01–0.1) was made by reacting HEC (molecular weight ~90,000; hydroxyethyl molar substitution ~2.5–3.2) with varying amounts of GPTMS. The silyl molar substitution (M.S.) and hydroxyethyl M.S. refer to the average number of the organosilyl moieties and oxyethylene units, respectively, attached per anhydroglucose unit of SIL-HEC.

The ease of water-solubility of the SIL-HEC was found to depend on the silyl M.S. At low silyl M.S. (0.01–0.05), SIL-HEC exhibits good dispersibility in water and dissolves rapidly to form clear solutions having a pH of 10–12. The sodium silanolate function, $\equiv$Si(O$^-$Na$^+$), is basic and accounts for the high solution pH. With increasing degree of silyl M.S., the ease with which SIL-HEC dissolves progressively decreases. However, difficultly soluble SIL-HEC can be dissolved in the presence of added alkali.

Silated polymers do not dissolve in acidic environments. However, addition of an acid to a dilute solution (1–3 wt % polymer) of SIL-HEC does not immediately occasion enhanced viscosity, gelation or precipitation of the polymer. Since SIL-HEC is anionic, it does react in solution with polyvalent metal ions, such as Ti$^{+4}$, to form viscoelastic gels.

One of the interesting properties of SIL-HEC is its ability to undergo self-crosslinking when cast from aqueous solutions to form films that are resistant to water and acid, but are soluble in alkali. Solution cast SIL-HEC films are clear, flexible and water resistant. These films, albeit water insoluble, imbibe water when they are suspended in aqueous media and become tacky, transparent and somewhat elastic.

Besides self-crosslinking, SIL-HEC can also react and crosslink with other water soluble polymers, such as HEC, hydroxypropylcellulose, sodium carboxymethylcellulose, carboxymethyl hydroxyethylcellulose, polyvinyl alcohol, polyethyloxazoline, polyethylenimine, aminated hydroxypropylcellulose, to form water and acid resistant films.

If desired, more than one type of water soluble polymer can be blended with SIL-HEC to cast a composite film. Composite films of water soluble polymers made in conjunction with SIL-HEC are also water resistant. Beside being water resistant, composite films made of SIL-HEC and a thermoplastic polymer, such as polyvinyl alcohol and polyethyloxazoline, are heat-sealable.

SIL-HEC exhibits good adhesive strength to various substrates and can be used to glue paper to paper, wood to wood, glass to glass, rubber to rubber, ceramic to ceramic, dry wall board to wood, paper to aluminum, rubber to wood, to name a few. Peel and lap shear tests for adhesion show substrate failure when paper and wood are glued together with SIL-HEC. HEC, by contrast, is not an adhesive for these substrates.

The unique properties of SIL-HEC and silated water soluble polymers, in general, suggest utility in a number of industrial applications that rely on:

(a) metal-crosslinked gels
(b) adhesion for various substrates
(c) water and acid resistant coatings Additionally, silation of water soluble polymers improves their dispersibility in water and aqueous systems to facilitate dissolution, especially at low degrees of silyl substitution.

The following examples illustrate the practice of the invention without being exhaustive.

EXAMPLE 1

Preparation of SIL-HEC

To a mixture of t-butyl alcohol (689 g), and sodium hydroxide solution (27.4 g of NaOH dissolved in 100 g of water) was added cellulose (M.W. ~48,000) (84 g; 5% moisture). The resulting mixture was vigorously mixed at 18°–20° C. for 45 minutes in a nitrogen atmosphere to alkalize the cellulose.

Ethylene oxide (27.3 g) was added to the alkalized cellulose slurry. After heating at 70° C. for 1 hr., the reaction mixture was cooled to 55° C. and treated with 70% nitric acid solution (42 g). After partial neutralization, the reactor charge was cooled to 40° C. To this reaction mixture were added (3-glycidoxypropyl)trimethoxysilane (GPTMS) (5 g, Aldrich) and ethylene oxide (70.3 g). The resulting reaction mixture was heated at 95° C. for 90 minutes and at 115° C. for 2 hrs. The reaction mixture was then cooled to room temperature and neutralized with 70% nitric acid (10 g).

The reaction mixture was filtered under suction and the residue washed four times with acetone/water (85:15 w/w) mixture followed by dehydration with 99% acetone. The dehydrated polymer cake was dried in a fluid bed dryer at 50° C. for 30 minutes.

Properties

The above SIL-HEC exhibited good dispersibility in water and completely dissolved to form a clear solution. It also dissolved and was compatible in a 4% calcium chloride solution.
Solution quality—Smooth
Clarity—Clear
Brookfield Viscosity (1% solution @ 30 rpm)—50 cps
pH (1% solution)—11.5

Analytical

Moisture—2.7%
Ash ($Na_2SO_4$)—9.1%
Hydroxyethyl M.S.—3.2
Silicon content—0.42%

EXAMPLE 2

Example 1 was repeated using 15 g of GPTMS. After the reaction of alkali cellulose with first stage ethylene oxide (27.3 g), the reaction mixture was partially neutralized with 29.7 g of 70% nitric acid solution.

Properties

The SIL-HEC isolated swelled in water, but did not dissolve. To this was added sodium hydroxide solution dropwise to adjust the pH to 11.2. The polymer dissolved at this pH to form a clear solution after stirring for 2 hours. The solution cast film was water resistant.

Analytical

Moisture—2.43 wt %
Ash (as $Na_2SO_4$)—2.69 wt %
HE M.S.—3.2
Silicon content—1.3 wt %

EXAMPLE 3

Example 1 was repeated using 5 g of 2-(3,4-epoxycyclohexyl)ethyltrimethoxysilane.

Properties

The silated HEC isolated dispersed very well in water and dissolved to form a smooth solution. The solution cast film was water resistant.

Analytical

Silicon Content—0.4%

EXAMPLE 4

Example 1 was repeated using PROSIL 2210, a silating agent available from PCR Inc., Gainesville, Fla.

Properties

The SIL-HEC isolated was water soluble. The solution cast film was clear and water resistant.

Analytical

Silicon Content—0.064%

EXAMPLE 5

Example 1 was repeated using 5 g of (3-glycidoxypropyl)pentamethyldisiloxane.

Properties

The SIL-HEC isolated was water soluble. The solution cast film was water resistant.

Analytical

Silicon Content—0.12%

EXAMPLE 6

Reaction of HEC with vinyltrimethoxysilane

To a mixture of hexane (300 g) and sodium hydroxide solution (4 g of NaOH dissolved in 30 g of water) at room temperature was added HEC (Natrosol ® 250 MBR type, 50 g). The resulting mixture was mixed under nitrogen atmosphere for 30 minutes. To this alkalized HEC slurry was added vinyltrimethoxysilane (3 g). The reaction mixture was heated at 50° C. for 5 hrs. and cooled to room temperature. After neutralization with glacial acetic acid (2 g), the reaction mixture was filtered. The residue was washed with acetone/water mixture (80:20 w/w) and finally dehydrated with 99% acetone. The dehydrated polymer cake was dried in a fluid bed dryer at 50° for 30 minutes.

Properties

The product was soluble in water. The aqueous solution formed a water resistant film upon drying in air.

Analytical

Silicon content—0.43%

EXAMPLE 7

Example 6 was repeated using methacryloxypropyltrimethoxysilane in place of vinyltrimethoxysilane. The reaction was carried out at 60° C. for 5 hours.

Properties

The isolated polymer was water soluble and formed a water resistant film when its aqueous solution was dried at 80° C.

Analytical

Silicon content - 0.9%.

EXAMPLE 8

Preparation of silated carboxymethylcellulose (SIL-CMC)

To a mixture of isopropanol (442 g), methanol (20 g) and sodium hydroxide solution (38 g of NaOH dissolved in 75 g of water) was added cellulose (M.W. ~450,000; 50g; 5% moisture). The resulting mixture was mixed at 17° C. for 1.5 h. under a nitrogen atmosphere. To the alkalized cellulose slurry was added a solution of monochloroacetic acid (42 g) in isopropanol (26 g) and water (4 g). The reaction mixture was heated at 70° C. for 1.5 h. Then GPTMS (3 g) was added to the reaction mixture and the resulting reaction mixture was heated at 90° C. for 1.5 h.

After cooling to room temperature, the reaction mixture was filtered and the residue washed three times with aqueous methanol. The purified polymer was steeped in acetone and then dried in a fluid bed drier at 50° C. for 30 minutes.

Properties

The SIL-CMC isolated was insoluble in water (pH of the slurry ~9.9). Upon adjusting the pH to 11.7 with NaOH solution, the SIL-CMC dissolved (1% Brookfield viscosity at 30 rpm ~3200 cps). The solution cast film was water resistant.

Analytical

Moisture—13.78%
Ash (as $Na_2SO_4$)—29.02%
Ash (direct)—21.41%
Silicon content—0.46%
Carboxymethyl degree of substitution—0.69

EXAMPLE 9

Preparation of silated carboxymethyl hydroxyethyl cellulose (SIL-CMHEC)

Cellulose (M.W. ~50,000; 84 g; 5% moisture) was slurried in a mixture of t-butyl alcohol (588 g) and sodium hydroxide (27.2 g) and water (115.2 g). The resulting slurry was mixed at room temperature under a nitrogen atmosphere for 45 minutes. To this alkalized slurry was added ethylene oxide (73 g). The reaction mixture was heated at 45° C. for 30 minutes and then at 75° C. for 1 hour.

After cooling the reaction mixture to 50° C., a solution of monochloroacetic acid (28 g) in t-butyl alcohol (44 g) and water (6.4 g) was added. This was followed by the addition of GPTMS (3 g). The resulting mixture was heated at 75° C. for 1 hour, cooled to room temperature and filtered.

The filtered cake was washed three times with acetone/water mixture (80:20 w/w) and finally steeped in acetone (99%). The purified polymer cake was dried in a fluid bed drier at 50° C. for 30 minutes.

Properties

The silated carboxymethyl hydroxyethylcellulose (SIL-CMHEC) thus isolated was soluble in water (1% Brookfield viscosity at 30 rpm ~42 cps; pH of 1% solution ~10.6). The solution cast film was water resistant.

Analytical

Moisture—12.99%
Ash (as $Na_2SO_4$)—21.17%
Silicon content—0.23%
Hydroxyethyl molar substitution—2.08
Carboxymethyl degree of substitution—0.36

EXAMPLE 10

Preparation of silated methylhydroxypropylcellulose (SIL-MHPC)

Methylhydroxypropylcellulose (Methocel® 240S from Dow Chemical Company) (200 g) was slurried in a mixture of heptane (540 g), t-butyl alcohol (120 g), NaOH (9 g) and water (120 g). The resulting mixture was mixed with strong agitation for 30 minutes at room temperature under a nitrogen atmosphere. To this alkalized MHPC slurry was added GPTMS (8 g). The resulting reaction mixture was heated at 95° C. for 4 h., cooled to room temperature and filtered.

The filtered cake was dried in a fluid bed drier at 50° C. for 30 minutes and the dry crude polymer slurried in boiling water. The polymer slurry was filtered and again washed with boiling water. The purified wet cake thus obtained was dried in a fluid bed drier at 50° C.

Properties

The SIL-MHPC isolated was partially soluble in water (pH 8.5). However, upon adjusting the pH to 11.5 with NaOH solution, complete dissolution of the polymer occurred. The solution cast film was water resistant.

Analytical

Hydroxypropyl M.S.—0.15
Methyl D.S.—1.8
Silicon content—0.1%

EXAMPLE 11

Preparation of cationically modified silated HEC

Silated HEC (SIL-HEC) was prepared from Rayonex® FF cellulose (available from ITT Rayonier) according to the procedure described in Example 1. This SIL-HEC (50 g) was slurried in a mixture of t-butyl alcohol (400 g), NaOH (1.5 g) and water (25 g). The resulting slurry was mixed at room temperature for 30 minutes in a nitrogen atmosphere. To this was added QUAB 426 (10 g) (40% solution of N(3-chloro-2-hydroxypropyl)-N,N-dimethyl-N-octadecyl ammonium chloride in propane-1,2-diol; available from Degussa Corporation. After heating at 65° C. for 5 h., the reaction mixture was cooled to room temperature and filtered. The filtered cake was washed three times with an acetone/water (80:20 w/w) mixture and finally steeped in acetone (99%). The purified polymer was dried in a fluid bed drier at 50° C. for 30 minutes.

Properties

The cationically modified SIL-HEC was water soluble (1% Brookfield viscosity at 30 rpm ~12 cps). The solution cast film was water resistant.

Analytical

Silicon solution—0.34%

EXAMPLE 12

Preparation of silated guar gum (SIL-GUAR)

Guar flour (Galactosol® 211, available from Aqualon Company) (120 g; 8% moisture) was added to a mixture of t-butyl alcohol (300 g) and sodium hydroxide solution (5 g of NaOH dissolved in 35 g of water). The resulting mixture was mixed at 23° C. for 30 minutes to alkalize the guar. To the alkalized guar gum was added GPTMS (5 g) and the resulting mixture was heated at 65° C. for 4 hours.

The reaction mixture was then cooled to room temperature, filtered and the residue washed with acetone/water (80:20 w/w) mixture. The purified SIL-GUAR was dehydrated with 99% acetone. The dehydrated polymer cake was dried in a fluid bed drier at 50° C. for 30 minutes.

Properties of SIL-GUAR

The above SIL-GUAR dissolved in water to form a viscous solution. The solution cast film was water insoluble.

Analytical

Silicon content—0.63 wt %

The original guar (Galactosol) contained 0.68% ash (as $Na_2SO_4$) and 0.34% silicon.

EXAMPLE 13

Preparation of silated hydroxyethylguar (SIL-HEG)

Hydroxyethylguar (HEG) was prepared by reacting guar (200 g) with ethylene oxide (30 g) at 70° C. for 2 hrs. in t-butyl alcohol (650 g) in the presence of sodium hydroxide (8 g of NaOH dissolved in 40 g of water). After cooling to room temperature, the reaction mixture was neutralized with 70% nitric acid (15 g).

The HEG was purified by washing with acetone/water mixture (80:20 w/w) and dried in a fluid bed drier at 50° C.

The above HEG was reacted with GPTMS following the procedure described in Example 2.

Properties of SIL-HEG

The SIL-HEG was soluble in water to form a viscous solution. The solution cast film was water insoluble.

EXAMPLE 14

Preparation of silated starch (SIL-STARCH)

Example 2 was repeated using corn starch (Cream brand from The Dial Corporation, Phoenix, Ariz.) in place of guar.

Properties

The resulting silated starch was about 90% soluble in boiling water. The solution cast film was water insoluble.

Analytical

Silicon content—0.54%.

EXAMPLE 15

Preparation of silated xanthan

Xanthan gum (50 g "as is" from Aldrich) was slurried in a mixture of hexane (300 g) and sodium hydroxide solution (4 g of NaOH dissolved in 20 g of water). The resulting slurry was mixed at 23° C. for 30 minutes. To this alkalized xanthan gum slurry was added GPTMS (5 g). The reaction mixture was heated at 65° C. for 5.5 h. and then cooled to room temperature. The slurry was filtered and the residue washed with acetone/water (80:20 w/w) mixture. The purified silated xanthan was dried overnight in a convection oven at 50° C.

Properties

The silated xanthan was water soluble. The solution cast film was water insoluble.

Analytical

Ash (by direct burning at 800° C.)—18.06 wt %
Ash (as $Na_2SO_4$)—25.8 wt %
Silicon content—0.99 wt %

EXAMPLE 16

Reaction of HEC with (3-isocyanatopropyl)triethoxysilane

HEC (M.S.~3.2; molecular weight~90,000) (20 g) was dissolved in dimethylacetamide (300 g) at room temperature. To this solution were added three drops of dibutyltin dilaurate (Alfa) and (3-isocyanatopropyl)triethoxysilane (1 g, Lancaster Synthesis). The resulting reaction mixture was vigorously agitated at room temperature in a dry nitrogen atmosphere for 5 h. during which time the reaction mixture thickened somewhat.

The viscous reaction mixture was added to acetone under strong agitation to precipitate the polymer. The precipitated polymer was washed three times with acetone and dried in a fluid bed drier at 50° C. for 30 minutes.

Properties

The above silated HEC swelled in water but did not dissolve. However, upon addition of sodium hydroxide to the swollen polymer slurry and agitation for 3 h., the polymer dissolved. The solution cast film was water resistant.

Analytical

Silicon content—0.42%

EXAMPLE 17

Reaction of HEC with (3-isocyanatopropyl)dimethylchlorosilane

Example 16 was repeated using the following reagents.
(a) HEC—10 g
(b) Dimethylacetamide—400 g
(c) Dibutyltin dilaurate—3 drops
(d) (3-Isocyanatopropyl)dimethylchlorosilane—2 g

Properties of the SIL-HEC isolated

The dry polymer was water insoluble. However, upon adding caustic, the polymer dissolved. The solution cast film was water insoluble.

Analytical

Moisture—2.45 wt %
Ash (as $Na_2SO_4$)—1.67 wt %
Ash (by direct burning at 800° C.)—0.61 wt %
Silicon content—0.19 wt %

EXAMPLE 18

GPTMS was used as the silating agent to react with hydrophobically modified hydroxyalkylcellulose, hydroxyethylguar, hydroxypropylcellulose, hydroxypropylguar and chitosan.

Hydroxyethylcellulose (HEC) was used as the polysaccharide with the following silating agents.

$$\underset{O}{\underset{\diagdown \diagup}{\bigtriangledown}}-CH_2-O-(CH_2)_3-Si\underset{OEt}{\overset{OEt}{\diagup}}CH_3$$

(3-glycidoxypropyl)methyldiethoxysilane $$\underset{O}{\underset{\diagdown \diagup}{\bigtriangledown}}-CH_2-O-(CH_2)_3-Si\underset{Me}{\overset{Me}{\diagup}}OEt$$

(3-glycidoxypropyl)dimethylethoxysilane $$\underset{O}{\underset{\diagdown \diagup}{\bigtriangledown}}-CH_2-O-(CH_2)_3-Si\underset{O-C=CH_2}{\overset{Me}{\diagup}}\underset{|}{\overset{|}{\underset{CH_3}{C=CH_2}}}$$

(3-glycidoxypropyl)methyldiisopropenoxysilane

-continued

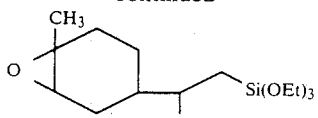

1-Methyl-4-[1-methyl-2-(triethoxysilylethyl)-cyclohexene-1-epoxide

Silated polysaccharides were produced in each case.

EXAMPLE 19

Evaluation of Adhesive Strength of SIL-HEC

In order to make quantitative assessments of the adhesive properties of SIL-HEC, the following substrates were glued together with 3% aqueous solution of SIL-HEC (silyl M.S. ~0.04). The adhesive strengths were tested after the bonds cured at room temperature. All paper and wood substrates failed.

| No. | Substrate | Test Performed | Peel (Shear) Strength (before substrate failure) |
|---|---|---|---|
| 1. | Paper/Paper | Peel Test | 0.65 lb/1" width |
| 2. | Aluminum Foil/Paper | Peel Test | 0.55 lb/1" width |
| 3. | Paper/Plywood | Peel Test | 2.2 lb/1" width |
| 4. | Plywood/Plywood | Lap Shear Test | 155 psi |

(Paper = Commercial joint compound tape)

What is claimed is:

1. An organosilyl modified cellulose ether with a hydrolytically stable silyl group covalently bonded to the modified cellulose ether wherein the number of silyl groups per anhydrosaccharide unit ranges from 0.005 to 2.0.

2. The organosilyl modified cellulose ether of claim 1 where the cellulose ether is hydroxyethylcellulose.

3. The organosilyl modified hydroxyethylcellulose of claim 2 where the number of silyl groups per anhydrosaccharide unit ranges from 0.005 to 0.5.

4. A water soluble organosilyl modified cellulose ether wherein an organosilane group species is covalently bonded to the cellulose ether through an amine, carbamyl or ether linkage to a degree of substitution between 0.005 and 0.5.

5. The organosilyl modified cellulose ether of claim 4 where the means for silyl substitution is an organosilane having the structure:

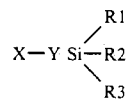

where,

X = a functional group capable of reacting with a cellulose ether,

Y = a hydrocarbyl spacer group between X and the silicon atom comprising up to five carbon atoms, $R_1$, $R_2$ and $R_3$ are groups attached to the silicon wherein at least one group must be hydrolyzable such as halogen or an alkoxy containing up to six carbon atoms.

6. The organosilyl modified cellulose ether of claim 5 where the organosilane is (3-glycidoxypropyl) trimethoxysilane or vinyltrimethoxysilane.

7. The organosilyl modified cellulose ether of claim 6 where the cellulose ether is hydroxyethylcellulose.

8. The organosilyl modified cellulose ether of claim 5 where X is a functional group selected from glycidoxy, epoxy, halide or isocyanate.

* * * * *